(12) United States Patent
Yao et al.

(10) Patent No.: US 8,053,516 B2
(45) Date of Patent: Nov. 8, 2011

(54) POLYLACTIC ACID RESIN COMPOSITION, METHOD FOR PRODUCING POLYLACTIC ACID RESIN COMPOSITION, AND POLYLACTIC ACID RESIN MOLDED ARTICLE

(75) Inventors: Kenji Yao, Kanagawa (JP); Masayuki Okoshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/848,694

(22) Filed: Aug. 2, 2010

(65) Prior Publication Data

US 2011/0207867 A1    Aug. 25, 2011

(30) Foreign Application Priority Data

Feb. 24, 2010   (JP) .................. 2010-039383

(51) Int. Cl.
*C08L 67/04* (2006.01)

(52) U.S. Cl. ........................................... 524/599
(58) Field of Classification Search .................. 524/599
See application file for complete search history.

(56) References Cited

U.S. PATENT DOCUMENTS

| | | | |
|---|---|---|---|
| 2,758,987 A | 8/1956 | Salzberg | |
| 4,057,537 A | 11/1977 | Sinclair | |
| 5,310,865 A | 5/1994 | Enomoto et al. | |
| 5,428,126 A | 6/1995 | Kashima et al. | |
| 2008/0262151 A1* | 10/2008 | Ishii et al. | 524/599 |

FOREIGN PATENT DOCUMENTS

| | | |
|---|---|---|
| EP | 0 712 880 A2 | 5/1996 |
| JP | A-2003-301327 | 10/2003 |
| JP | A-2008-019294 | 1/2008 |
| JP | A-2009-144075 | 7/2009 |

* cited by examiner

*Primary Examiner* — Peter Szekely
(74) *Attorney, Agent, or Firm* — Oliff & Berridge, PLC

(57) ABSTRACT

A polylactic acid resin composition contains a polylactic acid resin having an epoxy group, and a flame-retardant additive.

4 Claims, No Drawings

POLYLACTIC ACID RESIN COMPOSITION, METHOD FOR PRODUCING POLYLACTIC ACID RESIN COMPOSITION, AND POLYLACTIC ACID RESIN MOLDED ARTICLE

CROSS-REFERENCE TO RELATED APPLICATIONS

This application is based on and claims priority under 35 USC 119 from Japanese Patent Application No. 2010-039383 filed Feb. 24, 2010.

BACKGROUND (i) Technical Field

The present invention relates to a polylactic acid resin composition, a method for producing a polylactic acid resin composition, and a polylactic acid resin molded article.

(ii) Related Art

Recently, from the standpoint of environmental conservation, resin molded articles that use a biodegradable resin have been investigated for various applications. Among these applications, in the field of housings of electronic products or the like, flame retardancy is required for such resin molded articles.

SUMMARY

According to an aspect of the invention, there is provided a polylactic acid resin composition containing a polylactic acid resin having an epoxy group, and a flame-retardant additive.

DETAILED DESCRIPTION

An exemplary embodiment of the invention will now be described in detail. Note that the invention is not limited to the exemplary embodiment described below and the invention can be carried out by variously modifying within the scope of the gist of the invention.

Polylactic Acid Resin Composition (A) Polylactic Acid Resin

In this exemplary embodiment, an example of a polylactic acid resin having a molecular terminal modified by a reaction with a monoepoxy group-containing compound (i.e., monoepoxy compound), the polylactic acid resin being used as a component (A), is a polylactic acid resin in which an epoxy group has been introduced to a molecular terminal thereof by a reaction between a polylactic acid resin and a monoepoxy group-containing compound (hereinafter also referred to as "epoxy group-terminated polylactic acid resin").

Examples of the polylactic acid resin used in this exemplary embodiment include polylactic acid, copolymers of polylactic acid and other aliphatic polyesters, blends of polylactic acid and other aliphatic polyesters, and alloys of polylactic acid and other aliphatic polyesters. When the polylactic acid resin is composed of a copolymer, a blend, or an alloy, the amount of lactic acid component contained in the polylactic acid resin is 50% by weight or more, preferably 60% by weight or more, and further preferably 70% by weight or more.

Among these, polylactic acid, and copolymers of polylactic acid and other aliphatic polyesters are preferable, and polylactic acid is more preferable. The polylactic acid is not particularly limited so long as the polylactic acid is a polymer in which a lactic acid unit is repeated, and known polylactic acid may be used as the polylactic acid. The polylactic acid may contain, as a lactic acid component, L-lactic acid, D-lactic acid, or both L-lactic acid and D-lactic acid. From the standpoint of flexibility, among the lactic acid components of the polylactic acid, preferably, the content of L-lactic acid is 80% by weight or more or the content of D-lactic acid is 80% by weight or more. Furthermore, the polylactic acid may contain copolymer components other than lactic acid so long as advantages of the invention are not impaired. Examples of the other copolymer components include hydroxybutyric acids, hydroxyvaleric acids, and citric acids.

A method for producing polylactic acid or a copolymer of polylactic acid and other aliphatic polyesters is not particularly limited, and hitherto known methods may be employed. Examples of the method include (1) a method in which dehydration polycondensation is directly conducted using lactic acid or a mixture of lactic acid and an aliphatic hydroxycarboxylic acid as a starting material (for example, U.S. Pat. No. 5,310,865); (2) a ring-opening polymerization method including melt polymerization of a cyclic dimer of lactic acid (lactide) (for example, U.S. Pat. No. 2,758,987; (3) a ring-opening polymerization method including melt polymerization of a cyclic dimer of lactic acid and aliphatic hydroxycarboxylic acid, e.g., lactide or glycolide, and ε-caprolactone in the presence of a catalyst (for example, U.S. Pat. No. 4,057, 537); (4) a method in which dehydration polycondensation is directly conducted using a mixture of lactic acid, an aliphatic dihydric alcohol, and an aliphatic dibasic acid (for example, U.S. Pat. No. 5,428,126); (5) a method including condensing polylactic acid and a polymer of an aliphatic dihydric alcohol and an aliphatic dibasic acid in the presence of an organic solvent (for example, EP0712880/A2); and (6) a method in which solid-phase polymerization is conducted in at least one step in producing a polyester polymer by conducting a dehydration polycondensation reaction of lactic acid in the presence of a catalyst.

The polylactic acid resin used in this exemplary embodiment may be a blend or an alloy of polylactic acid and an aliphatic polyester, as required. Examples of the aliphatic polyester include polymers that can be produced by various combinations of an aliphatic hydroxycarboxylic acid other than polylactic acid, an aliphatic dihydric alcohol, and an aliphatic dibasic acid. As a method for producing the aliphatic polyester, methods similar to the methods for producing polylactic acid or a copolymer of polylactic acid and other aliphatic polyesters may also be employed, but the method is not limited thereto.

Specific examples of the aliphatic hydroxycarboxylic acid other than polylactic acid include glycolic acid, 3-hydroxybutyric acid, 4-hydroxybutyric acid, 3-hydroxyvaleric acid, 4-hydroxyvaleric acid, and 6-hydroxycaproic acid. Furthermore, cyclic esters of an aliphatic hydroxycarboxylic acid, such as glycolide, which is a dimer of glycolic acid, and ε-caprolactone, which is a cyclic ester of 6-hydroxycaproic acid may also be used. These may be used alone or in combination of two or more types of compounds.

Specific examples of the aliphatic dihydric alcohol include ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, and 1,4-cyclohexanedimethanol. These may be used alone or in combination of two or more types of aliphatic dihydric alcohols.

Specific examples of the aliphatic dibasic acid include succinic acid, oxalic acid, malonic acid, glutaric acid, adipic acid, pimelic acid, suberic acid, azelaic acid, sebacic acid, undecanedioic acid, and dodecanedioic acid. These may be used alone or in combination of two or more types of aliphatic dibasic acids.

The average molecular weight of the polylactic acid resin used in this exemplary embodiment is usually 10,000 or more and preferably 20,000 or more, but is 200,000 or less and preferably 150,000 or less in terms of weight-average molecular weight. If the average molecular weight of the polylactic acid resin is excessively small, formation of a network by cross-linking tends to become insufficient. If the average molecular weight of the polylactic acid resin is excessively large, cross-linking reactivity tends to decrease.

In this exemplary embodiment, a polylactic acid resin prepared by adding a crystallization accelerator to polylactic acid may be used. Examples of the crystallization accelerator include inorganic fillers such as talc and glass fiber; mica; trimesic acid tricyclohexylamide; trimesic acid tris(2-methylcyclohexylamide); and trimesic acid tris(2,3-dimethylcyclohexylamide). The amount of crystallization accelerator added is usually in the range of 0.1 to 30 parts by weight relative to 100 parts by weight of the polylactic acid resin.

(Monoepoxy Group-Containing Compound)

The monoepoxy group-containing compound (monoepoxy compound) is not particularly limited so long as the compound has one epoxy group in its molecule. In consideration of reactivity with a molecular terminal of the polylactic acid resin, an epoxy compound having at least one hydroxyl group in its molecules is used as an example of the monoepoxy group-containing compound in this exemplary embodiment.

Specific examples of such an epoxy compound include epoxy alcohol compounds, glycidyl ether compounds of a polyhydric alcohol, and an aromatic ring-containing polyglycidyl ether compounds.

In this exemplary embodiment, among these epoxy compounds having at least one hydroxyl group, epoxy alcohol compounds are preferable. Furthermore, a hydroxy-epoxy compound represented by general formula (1) below is more preferable.

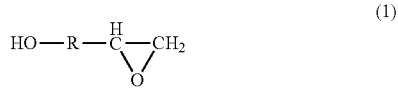

(1)

In general formula (1), R represents a linear alkylene group, branched alkylene group, arylene group, or arylalkylene group having 1 to 10 carbon atoms.

Examples of the linear alkylene group represented by R in general formula (1) include a methylene group, an ethylene group, a propylene group, a butylene group, a pentylene group, and a hexylene group. Examples of the branched alkylene group include a 2-methylbutylene group, a 2-methylpropylene group, and a 2-methylhexylene group. Examples of the arylene group include a phenylene group and a naphthylene group. Examples of the arylalkylene group include a phenylmethylene group, a phenylethylene group, and a phenylpropylene group.

Specific compounds represented by general formula (1) include glycidol, 1-hydroxyethyl ethylene oxide, 1-hydroxyhexyl ethylene oxide, 1-hydroxy-2-methylbutyl ethylene oxide, 1-hydroxy-2-methylhexyl ethylene oxide, and 1-hydroxyethyl-2-phenylpropyl ethylene oxide.

According to this exemplary embodiment, in the epoxy group-terminated polylactic acid resin used as the component (A), a ratio of the number of molecular terminals to which an epoxy group has been introduced by a reaction with the monoepoxy group-containing compound to the total number of molecular terminals of the polylactic acid resin used (hereinafter referred to as "terminal-epoxy group modification ratio") is preferably at least 30%. Furthermore, the terminal-epoxy group modification ratio is more preferably at least 50%, and particularly preferably at least 70%. If the terminal-epoxy group modification ratio is excessively low, the mechanical strength of resin molded articles decreases and the flame retardancy tends to decrease.

The terminal-epoxy group modification ratio is determined by a reaction titration measurement of unreacted terminals. Specifically, a sample is dissolved in chloroform and is then allowed to react with certain amounts of a monocarboxylic acid and an alcohol. Subsequently, the amounts of the monocarboxylic acid and alcohol remaining as reaction residues are quantified.

(B) Flame-Retardant Compound

A flame-retardant compound (i.e., flame-retardant additive) used as a component (B) in this exemplary embodiment is not particularly limited, and hitherto known additives may be used. Examples of such a flame-retardant compound include phosphorus flame-retardant compounds, boric acid flame-retardant compounds, inorganic flame-retardant compounds, nitrogen flame-retardant compounds, halogen flame-retardant compounds, organic flame-retardant compounds, and colloidal flame-retardant compounds. These may be used alone or in combination of two or more types of flame-retardant compounds.

Examples of the phosphorus flame-retardant compounds include ammonium phosphate, ammonium polyphosphate, aluminum polyphosphate, melamine polyphosphate, melamine pyrophosphate, red phosphorus, phosphate esters, tris(chloroethyl)phosphate, tris(monochloropropyl)phosphate, tris(dichloropropyl)phosphate, triallyl phosphate, tris (3-hydroxypropyl)phosphate, tris(tribromophenyl)phosphate, tris-β-chloropropyl phosphate, tris(dibromophenyl) phosphate, tris(tribromoneopentyl)phosphate, tetrakis(2-chloroethyl)ethylene diphosphate, dimethyl methyl phosphate, tris(2-chloroethyl)orthophosphate, aromatic condensed phosphates, halogen-containing condensed organophosphates, ethylenebis[tris(2-cyanoethyl)]phosphonium bromide, β-chloroethyl acid phosphate, butyl pyrophosphate, butyl acid phosphate, butoxyethyl acid phosphate, 2-ethylhexyl acid phosphate, melamine phosphate, halogen-containing phosphonates, and phenylphosphonic acid.

Examples of the boric acid flame-retardant compounds include compounds containing boric acid, such as zinc borate hydrate, barium metaborate, and borax.

Examples of the inorganic flame-retardant compounds include metal sulfate compounds such as zinc sulfate, potassium bisulfate, aluminum sulfate, antimony sulfate, potassium sulfate, cobalt sulfate, sodium bisulfate, iron sulfate, copper sulfate, sodium sulfate, nickel sulfate, barium sulfate, and magnesium sulfate; ammonium salt flame-retardant compounds such as ammonium sulfate; iron oxide combustion catalysts such as ferrocene; metal nitrate compounds such as copper nitrate; titanium-containing compounds such as titanium oxide; guanidine compounds such as guanidine sulfamate; carbonate compounds such as potassium carbonate; metal hydroxides such as aluminum hydroxide and magnesium hydroxide; zirconium compounds; molybdenum compounds; tin compounds; and montmorillonite.

Examples of the nitrogen flame-retardant compounds include cyanurate compounds having a triazine ring.

Examples of the halogen flame-retardant compounds include chlorinated paraffin, perchlorocyclopentadecane, hexabromobenzene, decabromodiphenyl oxide, bis(tribromophenoxy)ethane, ethylenebis(dibromonorbornanedicarboximide), ethylenebis(tetrabromophthalimide), dibromoethyl dibromocyclohexane, dibromoneopentyl glycol, 2,4,6-tribromophenol, tribromophenyl allyl ether, tetrabromobisphenol A derivatives, tetrabromobisphenol S derivatives, tetradecabromo diphenoxybenzene, tris(2,3-dibromopropyl)isocyanurate, 2,2-bis(4-hydroxy-3,5-dibromophenyl)propane, 2,2-bis(4-hydroxyethoxy-3,5-dibromophenyl)propane, poly(pentabromobenzyl acrylate), tribromostyrene, tribromophenyl maleimide, tribromoneopentyl alcohol, tetrabromodipentaerythritol, pentabromobenzyl acrylate, pentabromophenol, pentabromotoluene, pentabromodiphenyl oxide, hexabromocyclododecane, hexabromodiphenyl ether, octabromophenol ether, octadibromodiphenyl ether, octabromodiphenyl oxide, dibromoneopentyl glycol tetracarbonate, bis(tribromophenyl)fumaramide, N-methylhexabromodiphenylamine, bromostyrene, and diallyl chlorendate.

Examples of the organic flame-retardant compounds include silicone oil; silica compounds such as silicon dioxide, low-melting-point glass, and organosiloxane; compounds containing bisphenol A; glycidyl compounds such as glycidyl ethers; polyhydric alcohols such as diethylene glycol and pentaerythritol; modified carbamides; chlorendic anhydride; and phthalic anhydride.

Examples of the colloidal flame-retardant compounds include colloids of flame-retardant compounds such as hydroxides, e.g., aluminum hydroxide, magnesium hydroxide, and calcium hydroxide; hydrates, e.g., calcium aluminate, gypsum dihydrate, zinc borate, barium metaborate, borax, and kaolin clay; nitric acid compounds, e.g., sodium nitrate; molybdenum compounds; zirconium compounds; antimony compounds; dawsonite; and phlogopite.

Among these flame-retardant compounds, phosphorus flame-retardant compounds are preferable. In particular, phosphoric acid flame-retardant compounds such as ammonium polyphosphate, aluminum polyphosphate, melamine polyphosphate, and aromatic condensed phosphates are preferable.

In this exemplary embodiment, the amount of flame-retardant compound, which is the component (B), incorporated in the epoxy group-terminated polylactic acid resin, which is the component (A), is not particularly limited. Usually, 5 parts by weight or more, or about 5 parts by weight or more of the flame-retardant compound, which is the component (B), is added to 100 parts by weight of the polylactic acid resin, which is the component (A). Furthermore, the amount of component (B) incorporated is preferably 5 parts by weight or more or about 5 parts by weight or more, and further preferably 10 parts by weight or more or about 10 parts by weight or more. However, the amount of component (B) incorporated is usually 40 parts by weight or less or about 40 parts by weight or less, preferably 30 parts by weight or less or about 30 parts by weight or less, and further preferably 20 parts by weight or less or about 20 parts by weight or less. If the amount of component (B) is excessively small, flame retardancy tends to be insufficient. If the amount of component (B) is excessively large, durability tends to decrease.

The polylactic acid resin composition of this exemplary embodiment may contain, as a component (C), a polylactic acid resin having a molecular terminal modified by a reaction between the epoxy group-terminated polylactic acid resin, which is the component (A), and the flame-retardant compound, which is the component (B).

In the polylactic acid resin used as the component (C), a ratio of the number of molecular terminals to which a flame-retardant compound has been introduced by a reaction with the flame-retardant compound to the total number of molecular terminals of the polylactic acid resin used (hereinafter referred to as "terminal-flame-retardant compound modification ratio") is preferably at least 10%. Furthermore, the terminal-flame-retardant compound modification ratio is more preferably at least 20%. If the terminal-flame-retardant compound modification ratio is excessively small, the mechanical strength of resin molded articles decreases, and a long-term maintained property of the mechanical strength also tends to decrease.

The terminal-flame-retardant compound modification ratio is determined by measuring an infrared (IR) spectrum and a two-dimensional nuclear magnetic resonance (NMR) spectrum. Specifically, the intensities of a peak attributable to epoxy are compared between a sample and a composition obtained before the incorporation of the component (C), wherein the intensity of the peak obtained by measuring the composition obtained before the incorporation of the component (C) is assumed to be 100.

(Hydrolysis Inhibitor)

The polylactic acid resin composition of this exemplary embodiment may further contain, as a component (D), a hydrolysis inhibitor. By incorporating the hydrolysis inhibitor, which is the component (D), hydrolysis of the polylactic acid resin is suppressed, and a decrease in the mechanical strength of resin molded articles obtained from the resulting resin composition tends to be suppressed.

Examples of the hydrolysis inhibitor that can be used as the component (D) include, but are not particularly limited to, compounds known as additives that suppress hydrolysis of polymer compounds having a carboxyl group (—COOH), a hydroxyl group (—OH), or the like. Examples of such compounds include carbodiimide compounds and oxazoline compounds.

Examples of the carbodiimide compounds include dicyclohexylcarbodiimide, diisopropylcarbodiimide, dimethylcarbodiimide, diisobutylcarbodiimide, dioctylcarbodiimide, diphenylcarbodiimide, and naphthylcarbodiimide.

Examples of the oxazoline compounds include 2,2'-o-phenylenebis(2-oxazoline), 2,2'-m-phenylenebis(2-oxazoline), 2,2'-p-phenylenebis(2-oxazoline), 2,2'-p-phenylenebis(4-methyl-2-oxazoline), 2,2'-m-phenylenebis(4-methyl-2-oxazoline), 2,2'-p-phenylenebis(4,4'-dimethyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-ethylenebis(4-methyl-2-oxazoline), and 2,2'-diphenylenebis(2-oxazoline). These may be used alone or in combination of two or more types of hydrolysis inhibitors.

The amount of hydrolysis inhibitor added as the component (D) is not particularly limited. In this exemplary embodiment, the amount of hydrolysis inhibitor used as the component (D) is usually 5 parts by weight or less or about 5 parts by weight or less, and preferably 2 parts by weight or less or about 2 parts by weight or less relative to 100 parts by weight of the polylactic acid resin.

If the amount of hydrolysis inhibitor serving as the component (D) relative to the amount of polylactic acid resin is excessively large, gelation may occur and thus the moldability tends to decrease. From the standpoint of flame retardancy, the ratio of the hydrolysis inhibitor to the flame-retardant compound is preferably 1:2 to 1:50, or about 1:2 to 1:50.

(Other Additives)

The polylactic acid resin composition of this exemplary embodiment may contain known other additives. Examples of such known additives include a reinforcing material, inorganic filler, organic filler, an antioxidant, a heat stabilizer, an ultraviolet absorber, a lubricant, wax, and a coloring agent. These additives may be used alone or in combination of two or more.

Examples of the reinforcing material include glass microbeads, carbon fiber, chalk, quartz, asbestos, feldspar, mica, talc, wollastonite, and kaolin. Examples of the inorganic filler include alumina, silica, magnesia, ferrite, barium sulfate, calcium carbonate, and fullerene, besides carbon and silicon dioxide. Examples of the organic filler include epoxy resins, melamine resins, urea resins, acrylic resins, phenolic resins, polyimide resins, polyamide resins, polyester resins, and fluorocarbon resins. These may be used alone or as a mixture of two or more types of additives.

Examples of the antioxidant include phenolic, amine, phosphorus, sulfur, hydroquinone, and quinoline antioxidants.

Examples of the heat stabilizer include nitrogen-containing compounds such as basic nitrogen-containing compounds, e.g., polyamides, poly-β-alanine copolymers, polyacrylamide, polyurethanes, melamine, cyanoguanidine, and melamine-formaldehyde condensation products; and alkali metal- or alkaline earth metal-containing compounds such as organic carboxylic acid metal salts (e.g., calcium stearate and calcium 12-hydroxystearate), metal oxides (e.g., magnesium oxide, calcium oxide, and aluminum oxide), metal hydroxides (e.g., magnesium hydroxide, calcium hydroxide, and aluminum hydroxide), and metal carbonates; zeolite; and hydrotalcite.

Examples of the ultraviolet absorber include benzophenone, benzotriazole, cyanoacrylate, salicylate, and oxalic anilide ultraviolet absorbers.

Examples of the lubricant include petroleum lubricating oil such as liquid paraffin; synthetic lubricating oil such as halogenated hydrocarbons, diester oil, silicone oil, and fluorine silicone; various modified silicone oil (e.g., epoxy-modified, amino-modified, alkyl-modified, or polyether-modified silicone oil); silicone lubricating substances such as copolymers of a silicone and an organic compound, e.g., a polyoxyalkylene glycol; silicone copolymers; various fluorine surfactants such as fluoroalkyl compounds; fluorine lubricating substances such as trifluoromethylene chloride low polymers; wax such as paraffin wax and polyethylene wax; higher aliphatic alcohols; higher aliphatic amides; higher fatty acid esters; higher fatty acid salts; and molybdenum disulfide.

Examples of the wax include olefin wax such as polypropylene wax and polyethylene wax, paraffin wax, Fischer-Tropsch wax, microcrystalline wax, montan wax, fatty acid amide wax, higher aliphatic alcohol wax, higher fatty acid wax, fatty acid ester wax, carnauba wax, and rice wax.

Examples of the coloring agent include inorganic pigments, organic pigments, and dyes.

Method for Producing Polylactic Acid Resin Composition

An example of a method for producing a polylactic acid resin composition of this exemplary embodiment is a method including melt-kneading a polylactic acid resin, a monoepoxy group-containing compound, a flame-retardant compound, and other optional components with a known kneader. Examples of the kneader include a Banbury mixer, a single-screw extruder, a twin-screw extruder, a ko-kneader, a multi-screw extruder. Among these kneaders, a twin-screw extruder or a single-screw extruder is preferable.

Specifically, a polylactic acid resin, a monoepoxy group-containing compound, a flame-retardant compound, and other optional components are melt-kneaded with an extruder, preferably a twin-screw extruder at a preset cylinder temperature in the range of, for example, about 160° C. to 250° C., and preferably about 170° C. to 200° C., the resulting mixture is extruded, the resulting strands are cut to prepare a polylactic acid resin composition as a master batch in the form of columnar pellets. Alternatively, the polylactic acid resin composition may be prepared as spherical pellets by a hot-cut method or an under-water cut method without taking up the strands.

In this exemplary embodiment, by melt-kneading the polylactic acid resin, the monoepoxy group-containing compound, the flame-retardant compound, and other optional components, an epoxy group is introduced to a molecular terminal of the polylactic acid resin to obtain the epoxy group-terminated polylactic acid resin, which is the component (A). Furthermore, some of the epoxy groups that have been introduced to molecular terminals of the epoxy group-terminated polylactic acid resin react with the flame-retardant compound, which serves as the component (B), to obtain the polylactic acid resin in which the flame-retardant compound has been introduced to a molecular terminal thereof, the polylactic acid resin serving as the component (C).

In this exemplary embodiment, the amount of monoepoxy group-containing compound added in order to obtain the epoxy group-terminated polylactic acid resin, which is the component (A), is not particularly limited. The amount of monoepoxy group-containing compound is 1 part by weight or more, or about 1 part by weight or more, and more preferably 2 parts by weight or more, or about 2 parts by weight or more relative to 100 parts by weight of the polylactic acid resin. However, the amount of monoepoxy group-containing compound is 10 parts by weight or less, or about 10 parts by weight or less, and more preferably 8 parts by weight or less, or about 8 parts by weight or less. If the amount of monoepoxy group-containing compound relative to the amount of polylactic acid resin is excessively small, the terminal-epoxy group modification ratio of the polylactic acid resin decreases, and the mechanical strength of resin molded articles tends to decrease.

The amount of flame-retardant compound added in order to obtain the polylactic acid resin in which the flame-retardant compound has been introduced to a molecular terminal thereof, the polylactic acid resin functioning as the component (C), is not particularly limited. The amount of flame-retardant compound is usually 5 parts by weight or more, or about 5 parts by weight or more, preferably 10 parts by weight or more, or about 10 parts by weight or more relative to 100 parts by weight of the polylactic acid resin. However, the amount of flame-retardant compound is usually 40 parts by weight or less, or about 40 parts by weight or less, preferably 30 parts by weight or less, or about 30 parts by weight or less. If the amount of flame-retardant compound relative to the polylactic acid resin is excessively small, the terminal-flame-retardant compound modification ratio of the polylactic acid resin decreases, and the mechanical strength of resin molded articles tends to decrease.

Polylactic Acid Resin Molded Article

A polylactic acid resin molded article is obtained by using the polylactic acid resin composition described above. A polylactic acid resin composition molded article (hereinafter, simply referred to as "molded article") of this exemplary embodiment contains a polylactic acid resin having a molecular terminal to which an epoxy group has been introduced, the polylactic acid resin serving as the component (A), and a flame-retardant compound serving as the component (B) in the polylactic acid resin composition described above.

Furthermore, the molded article may contain, as a component (C), a polylactic acid resin having a molecular terminal modified by a reaction between the epoxy group that has been introduced to the terminal of the polylactic acid resin serving as the component (A) and the flame-retardant compound serving as the component (B).

The molded article of this exemplary embodiment can be suitably used in applications such as electronic/electric devices, household electric appliances, containers, and interior materials for automobiles. More specifically, the molded article can be suitably used in housings, various components, and the like of household electric appliances or electronic/electric devices, wrapping films, cases for CD-ROMs or DVDs, tableware, food trays, drink bottles, and wrapping materials for chemicals. Among these, the molded article of this exemplary embodiment is suitable for components of electronic/electric devices.

Method for Producing Polylactic Acid Resin Molded Article

Examples of a method for producing a polylactic acid resin molded article of this exemplary embodiment include known forming methods and are not particularly limited. Examples of the known forming methods include film forming, extrusion molding, and injection molding. Among these methods, injection molding is preferable. Specifically, extrusion molding can be conducted in accordance with commonly used method using a known extruder such as a single-screw extruder, a multi-screw extruder, or a tandem extruder. Injection molding can be conduced in accordance with a commonly used method using a known injection molding machine such as an in-line screw-type injection molding machine, a multilayer injection molding machine, or a double-head injection molding machine.

In this exemplary embodiment, the polylactic acid resin composition is preferably injected into a mold at a cylinder temperature of an injection molding machine in the range of 160° C. to 220° C. The temperature of the mold during injection molding is preferably in the range of 30° C. to 150° C.

A molded article of this exemplary embodiment has an improved mechanical strength, and the mechanical strength is maintained for a long period of time (long-term maintained property), thus extending the lifecycle of the resulting product.

The reason why the mechanical strength of the molded article described above is improved is not clear, but is believed to be as follows.

When an epoxy group is introduced to a molecular terminal of a polylactic acid resin, the compatibility between the polylactic acid resin and a flame-retardant compound improves. Furthermore, the flame-retardant compound is introduced to some of molecular terminals to which the epoxy groups have been introduced. Consequently, a higher-order structure of the polylactic acid resin, which is disordered by the incorporation of a flame-retardant compound in the related art, is maintained. Therefore, the mechanical strength of molded articles is improved.

In addition, a water-absorbing property of the polylactic acid resin whose molecular terminals are blocked decreases, and thus hydrolysis resistance is improved. Accordingly, it is believed that the mechanical strength of molded articles is maintained for a long period of time.

EXAMPLES

The invention will now be described in more detail by way of Examples. However, the invention is not limited to Examples below.

Examples 1 to 13 and Comparative Examples 1 to 4

A polylactic acid resin, a monoepoxy group-containing compound, and a flame-retardant compound were kneaded with a twin-screw extruder (produced by Toshiba Machine Co., Ltd., TEM58SS) under the conditions of the compositions and the cylinder temperature shown in Tables 1 and 2 to prepare pellets of a polylactic acid resin composition (Examples 1 to 13). For comparison, pellets of resin compositions (Comparative Examples 1 to 4) that contained no monoepoxy group-containing compound were prepared under the conditions of the compositions and the cylinder temperature shown in Table 2.

Next, ISO multi-purpose dumbbell test specimens (thickness: 4 mm, width: 10 mm, in accordance with the ISO527 tensile test and the ISO178 bending test) were molded using the pellets of the polylactic acid resin compositions described above. Characteristic tests of the polylactic acid resin molded articles were conducted as described below (Examples 1 to 13). In addition, test specimens were similarly molded using the resin compositions of Comparative Examples 1 to 4, and the characteristic tests of each of the resin molded articles were conducted. The results are shown in Tables 1 and 2.

(1) Terminal Modification Ratio of Polylactic Acid Resin

A ratio of the number of molecular terminals to which an epoxy group has been introduced by a reaction with a monoepoxy group-containing compound to the total number of molecular terminals of a polylactic acid resin ("terminal-epoxy group modification ratio (unit: %)) was determined by a reaction titration.

A ratio of the number of molecular terminals to which a flame-retardant compound has been introduced by a reaction with the flame-retardant compound to the total number of molecular terminals of a polylactic acid resin (terminal-flame-retardant compound modification ratio (unit: %)) was determined by IR and two-dimensional NMR spectroscopy.

(2) Flame Retardant Test of Polylactic Acid Resin Molded Article

Test specimens of the UL (Underwriters Laboratories, Inc.,) standard having two thicknesses (0.8 mm and 1.6 mm) were formed by injection molding with an injection molding machine (produced by Nissei Plastic Industrial Co., Ltd., NEX50) using each of the polylactic acid resin compositions under the conditions of the cylinder temperatures shown in Tables 1 and 2 and a molding cycle of 1 minute. A 20-mm vertical burning test of the UL standard 94 was then conducted. As for the UL rating, "V0" means V-0 acceptance, "V1" means V-1 acceptance, and "NotV" means non-acceptance.

In the test, each of V-0 and V-1 is determined using five test specimens. Specifically, a burner flame is applied to the lower edge of a vertically supported strip specimen. This state is maintained for 10 seconds, and the burner flame is then removed from the specimen. If the flame goes out, the burner flame is immediately reapplied for additional 10 seconds and is then removed.

The rating V0 or V1 is determined on the basis of a flaming combustion time after each of the first flame application and the second flame application, the total of the flaming combustion time and a glowing combustion time after the second flame application, the total flaming combustion time of the five specimens, and the presence or absence of flaming particles (drips).

When flaming combustion ceases within 10 seconds after each of the first flame application and the second flame application, the specimens are evaluated as V-0. When flaming combustion ceases within 30 seconds after each of the first flame application and the second flame application, the specimens are evaluated as V-1. Furthermore, when the total of the flaming combustion time and the glowing combustion time after the second flame application is within 30 seconds, the specimens are evaluated as V-0. When the total of the flaming combustion time and the glowing combustion time after the second flame application is within 60 seconds, the specimens are evaluated as V-1.

Furthermore, when the total flaming combustion time of the five specimens is within 50 seconds, the specimens are evaluated as V-0. When the total flaming combustion time of the five specimens is within 250 seconds, the specimens are evaluated as V-1. Furthermore, it is necessary that all the specimens do not burn out.

(3) Impact Strength of Polylactic Acid Resin Molded Article

ISO multi-purpose dumbbell test specimens (thickness of testing portion: 4 mm, width: 10 mm) in accordance with the ISO527 tensile test and the ISO178 bending test were formed as polylactic acid resin molded articles using the pellets of each of the polylactic acid resin compositions by injection molding with an injection molding machine (produced by Nissei Plastic Industrial Co., Ltd., NEX50) under the conditions of the cylinder temperatures and the mold temperatures shown in Tables 1 and 2.

Next, the molded ISO multi-purpose dumbbell test specimens were processed into Charpy test specimens with notches in accordance with ISO179. A Charpy impact strength test was conducted to measure the Charpy impact strength of the polylactic acid resin molded articles (unit: $kJ/m^2$).

Furthermore, the ISO dumbbell test specimens were left to stand in an environment of 55° C./85% for 1,000 hours. The ISO dumbbell test specimens were processed into Charpy test specimens to measure the Charpy impact strength (long-term maintained property) (unit: $kJ/m^2$).

TABLE 1

| | | | Examples | | | | | | | | | |
|---|---|---|---|---|---|---|---|---|---|---|---|---|
| | | | 1 | 2 | 3 | 4 | 5 | 6 | 7 | 8 | 9 |
| Resin compositions | Polylactic acid resin (*) | Terramac TE-2000 | 100 | 100 | 100 | 100 | 100 | 100 | 100 | 100 | 100 |
| | | Terramac TE-7000 | — | — | — | — | — | — | — | — | — |
| | Monoepoxy group-containing compound | 1-Hydroxyethyl ethylene oxide | 2 | 4 | 6 | 8 | — | — | 4 | 4 | 4 |
| | | 1-Hydroxyhexyl ethylene oxide | — | — | — | — | 4 | — | — | — | — |
| | | 1-Hydroxy-2-phenylpropyl ethylene oxide | — | — | — | — | — | 4 | — | — | — |
| | Flame-retardant compound (**) | Exolit OP 930 | 20 | 20 | 20 | 20 | 20 | 20 | 15 | 30 | — |
| | | Exolit AP 422 | — | — | — | — | — | — | — | — | 20 |
| | | PX 200 | — | — | — | — | — | — | — | — | — |
| | | MPP-A | — | — | — | — | — | — | — | — | — |
| | Hydrolysis inhibitor | Carbodiimide (***) | — | — | — | — | — | — | — | — | — |
| | Kneading condition | Cylinder temperature ° C. | 170 | 180 | 180 | 180 | 180 | 180 | 180 | 190 | 170 |
| | Terminal-epoxy group modification ratio (%) | | 53 | 75 | 83 | 89 | 78 | 73 | 75 | 74 | 75 |
| | Terminal-flame-retardant compound modification ratio (%) | | 18 | 22 | 22 | 23 | 19 | 18 | 11 | 35 | 17 |
| Resin molded articles | Molding condition | Cylinder temperature ° C. | 180 | 180 | 180 | 180 | 180 | 180 | 180 | 180 | 170 |
| | | Mold temperature ° C. | 40 | 40 | 40 | 40 | 40 | 40 | 40 | 40 | 40 |
| | Charpy impact strength ($kJ/m^2$) | After molding | 5 | 6.5 | 6.8 | 6.5 | 6.2 | 6.1 | 5.9 | 6.3 | 6.1 |
| | | After 55° C./85%/1000 hrs | 3.8 | 4.8 | 5.2 | 5.5 | 5.8 | 5.1 | 5.1 | 5.9 | 5.2 |
| | Flame retardant test | 0.8 mm-V | V1 | V0 | V0 | V0 | V0 | V0 | V0 | V1 | V0 |
| | | 1.6 mm-V | V0 | V0 | V0 | V0 | V0 | V1 | V0 | V0 | V1 |

TABLE 2

| | | | Examples | | | | Comparative Examples | | | |
|---|---|---|---|---|---|---|---|---|---|---|
| | | | 10 | 11 | 12 | 13 | 1 | 2 | 3 | 4 |
| Resin compositions | Polylactic acid resin (*) | Terramac TE-2000 | 100 | 100 | 100 | 100 | 100 | 100 | 100 | — |
| | | Terramac TE-7000 | — | — | — | — | — | — | — | 100 |
| | Monoepoxy group-containing compound | 1-Hydroxyethyl ethylene oxide | 4 | 4 | 4 | 4 | — | — | — | — |
| | | 1-Hydroxyhexyl ethylene oxide | — | — | — | — | — | — | — | — |
| | | 1-Hydroxy-2-phenylpropyl ethylene oxide | — | — | — | — | — | — | — | — |

TABLE 2-continued

|  |  |  | Examples | | | | Comparative Examples | | | |
|---|---|---|---|---|---|---|---|---|---|---|
|  |  |  | 10 | 11 | 12 | 13 | 1 | 2 | 3 | 4 |
|  | Flame-retardant compound (**) | Exolit OP 930 | — | — | 20 | 20 | 20 | 40 | 10 | 20 |
|  |  | Exolit AP 422 | — | — | — | — | — | — | — | — |
|  |  | PX 200 | 20 | — | — | — | — | — | — | — |
|  |  | MPP-A | — | 20 | — | — | — | — | — | — |
|  | Hydrolysis inhibitor | Carbodiimide (***) | — | — | 2 | — | 2 | 2 | 3 | 3 |
|  | Kneading condition | Cylinder temperature ° C. | 190 | 180 | 190 | 180 | 180 | 180 | 180 | 180 |
|  |  | Terminal-epoxy group modification ratio (%) | 74 | 74 | 73 | 75 | — | — | — | — |
|  |  | Terminal-flame-retardant compound modification ratio (%) | 19 | 18 | 17 | 18 | — | — | — | — |
| Resin molded articles | Molding condition | Cylinder temperature ° C. | 190 | 180 | 180 | 180 | 180 | 180 | 180 | 180 |
|  |  | Mold temperature ° C. | 40 | 40 | 40 | 110 | 40 | 40 | 40 | 40 |
|  | Charpy impact strength (kJ/m$^2$) | After molding | 6.3 | 6.2 | 7.5 | 6.9 | 1.7 | 2.2 | 1.5 | 2.5 |
|  |  | After 55° C./85%/1000 hrs | 5.3 | 5.5 | 6.2 | 6.2 | 0.3 | 0.5 | 0.2 | 0.5 |
|  | Flame retardant test | 0.8 mm-V | V0 | V0 | V0 | V0 | NotV | NotV | NotV | NotV |
|  |  | 1.6 mm-V | V0 | V0 | V0 | V0 | V1 | V0 | V1 | V1 |

Note that the components of the polylactic acid resin compositions shown in Tables 1 and 2 are as follows:
(*) Polylactic acid resin
Terramac TE-2000 (produced by UNITIKA Ltd.)
Terramac TE-7000 (produced by UNITIKA Ltd.)
(**) Flame-retardant compound
Exolit OP 930: Aluminum polyphosphate (produced by Clariant (Japan) K.K.)
Exolit AP 422: Ammonium polyphosphate (produced by Clariant (Japan) K.K.)
PX 200: Aromatic condensed phosphate (produced by Daihachi Chemical Industry Co., Ltd.)
MPP-A: Melamine polyphosphate (produced by Sanwa Chemical Co., Ltd.)
(***) Hydrolysis inhibitor: Carbodilite LA1 (produced by Nisshinbo Chemical Inc.)

Referring to Tables 1 and 2, polylactic acid resin molded articles obtained from polylactic acid resin compositions containing an epoxy group-terminated polylactic acid resin used as the component (A) and a flame-retardant compound used as the component (B) showed satisfactory results for the flame retardant test and had high Charpy impact strength (kJ/m$^2$). These results showed that good flame retardancy could be realized without impairing the mechanical strength of the polylactic acid resins (Examples 1 to 13).

In contrast, even when a flame-retardant compound was added to polylactic acid resins that did not have molecular terminals modified by a reaction with a monoepoxy group-containing compound in an amount substantially the same as that in Examples (Comparative Examples 1 to 4), the Charpy impact strength (kJ/m$^2$) decreased and satisfactory flame retardancy could not be obtained.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method for producing a polylactic acid resin composition comprising:
   kneading a polylactic acid resin, a flame-retardant additive, and a hydroxy-epoxy compound represented by general formula (1):

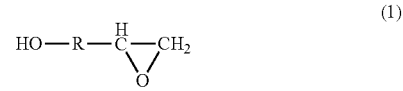

wherein R represents a linear alkylene group, branched alkylene group, arylene group, or arylalkylene group having 1 to 10 carbon atoms.

2. The method according to claim 1, wherein the amount of the hydroxy-epoxy compound is about 1 part by weight or more and about 10 parts by weight or less relative to 100 parts by weight of the polylactic acid resin.

3. The method according to claim 1, wherein the amount of the flame-retardant additive is about 2 parts by weight or more and about 300 parts by weight or less relative to 100 parts by weight of the polylactic acid resin.

4. The method according to claim 1, wherein the amount of the flame-retardant additive is about 10 parts by weight or more and about 200 parts by weight or less relative to 100 parts by weight of the polylactic acid resin.

* * * * *